United States Patent [19]

Paris, Jr. et al.

[11] 4,243,082

[45] Jan. 6, 1981

[54] RAFTER SIDE SLOTTER

[75] Inventors: Alfonso A. Paris, Jr.; Douglas W. Muscanell, both of South Hill, Va.; James H. Grutter, Grand Rapids, Mich.

[73] Assignee: New England Log Homes, Inc., Hamden, Conn.

[21] Appl. No.: 925,773

[22] Filed: Jul. 18, 1978
(Under 37 CFR 1.47)

[51] Int. Cl.³ .................................................. B27C 5/02
[52] U.S. Cl. .............................. 144/133 R; 83/471.3; 83/484; 83/875; 144/3 R; 144/203; 144/323
[58] Field of Search ............ 144/2 R, 82, 133 R, 144/134 R, 136 R, 136 G, 136 H, 203, 204, 198, 323, 88, 89, 200, 201, 203, 204, 3 R; 83/471.2, 471.3, 483, 484, 486, 486.1, 472, 473, 875, 876

[56] References Cited

U.S. PATENT DOCUMENTS

| | | | |
|---|---|---|---|
| 2,505,958 | 5/1950 | Grierson | 83/471.2 |
| 3,379,227 | 4/1968 | Mason | 83/471.2 |
| 3,719,216 | 3/1973 | Tracy | 83/471.2 |
| 3,799,224 | 3/1974 | Vizziello et al. | 144/133 R |
| 3,865,161 | 2/1975 | Vizziello et al. | 144/134 R |
| 4,064,920 | 12/1977 | Piche | 83/471.2 |

*Primary Examiner*—W. Donald Bray
*Attorney, Agent, or Firm*—DeLio and Montgomery

[57] ABSTRACT

A machine for cutting one or two slots in the sides of a log intended for use as a roofing rafter, the machine including a pair of dado saws, means for moving the saws up and down past the sides of a log, and supports for the saws which are adjustable to coordinate the angle of the cuts with the angle of a previously made notch.

6 Claims, 4 Drawing Figures

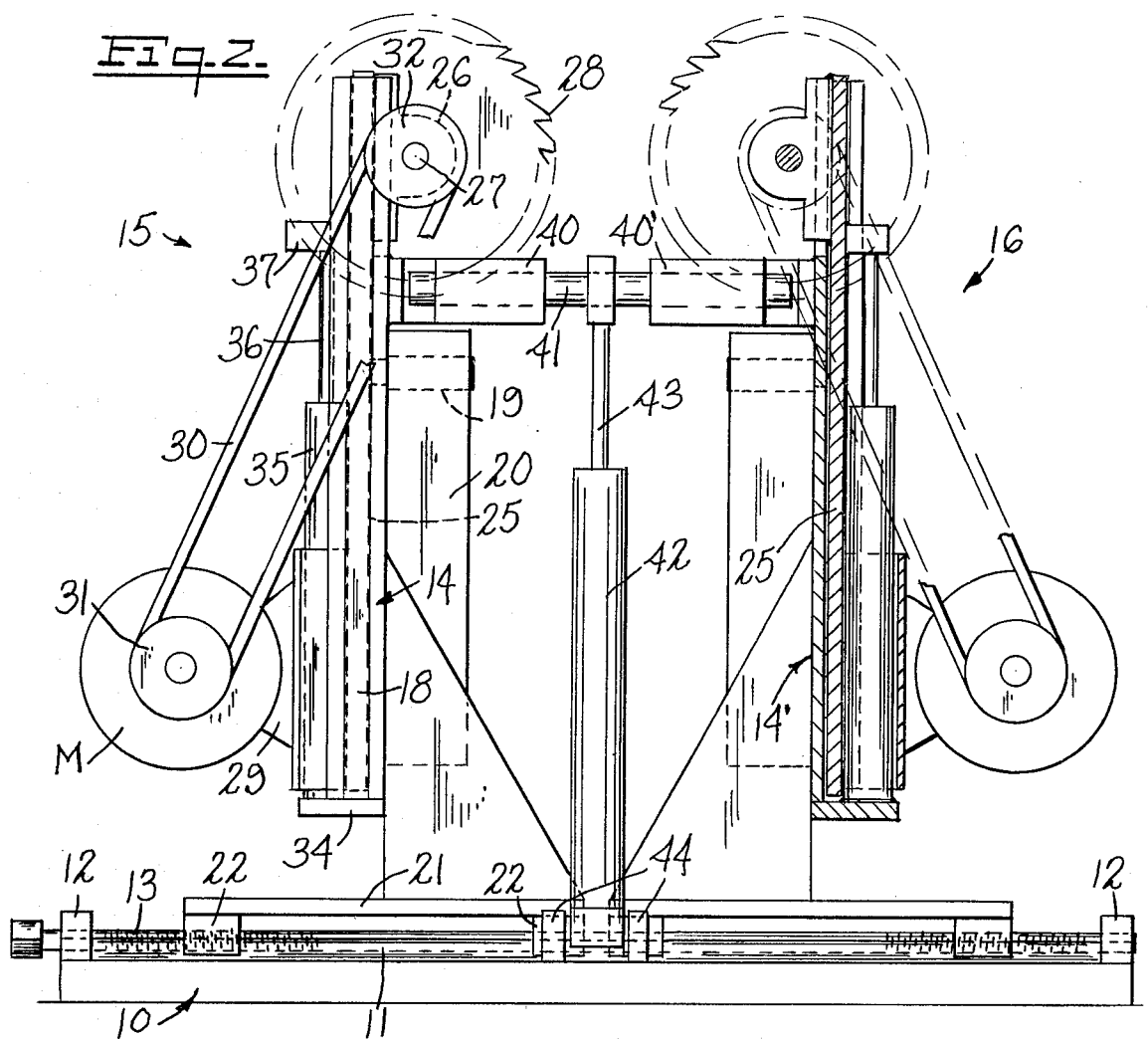
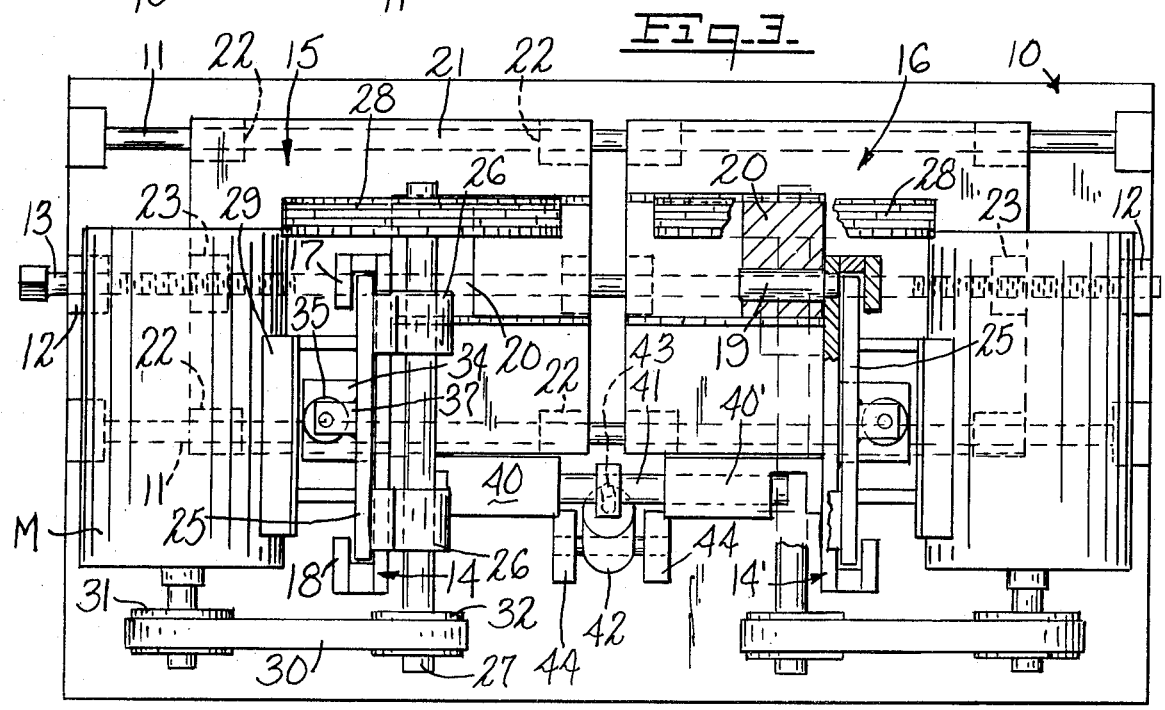

RAFTER SIDE SLOTTER

This invention relates to a machine for side cutting or slotting of roofing rafters, particularly rafters to be used in the construction of log buildings such as log homes. When the lower surface of a roofing rafter has been notched at an angle suitable for formation of a horizontal seat, to rest on the top log in the wall, it is customary to cut into one or both sides of the rafter a vertical slot to receive one end of a flat "wind stop" board. The wind stops serve to fill the spaces between the sides of adjacent rafters, the top of the uppermost wall log, and the bottom surface of the roofing. The wind stop slots must be cut at a uniform angle for each roof pitch and must be accurately registered with the angular notches in the rafters, commonly referred to as "bird's mouth" cuts or notches. Each rafter, except at the end of a wall, requires matching wind stop slots, one on each side.

It is accordingly an object of the invention to provide a rafter side cutting machine wherein a rafter can be moved into cutting position on a feed table and subjected to the action of one or a pair of rotary saws such as dado saws, which are moved upward past the sides of the log on guides which are adjusted to proper angles perpendicular to the plane of the major surface in the rafter notch.

It is another object of the invention to provide a rafter side cutting machine with two saws and means for adjusting both the angular positions of the saws and the spacing thereof.

It is a further object of the invention to provide a rafter side cutting machine with two saws and means for lifting one or both saws into cutting position either independently or simultaneously.

It is yet another object of the invention to provide a rafter side cutting machine wherein the operating elements are readily accessible for adjustment, replacement or repair.

It is a still further object of the invention to provide certain improvements in the form, construction and arrangement of the several parts whereby the above-named and other objects may effectively be attained.

The invention accordingly comprises the features of construction, combinations of elements, and arrangement of parts which will be exemplified in the constructions hereinafter set forth, and the scope of the invention will be indicated in the claims.

A practical embodiment of the invention is shown in the accompanying drawings wherein:

FIG. 2 represents an end elevation of the machine;

FIG. 3 represents a top plan view of the machine; and

Figure 4:
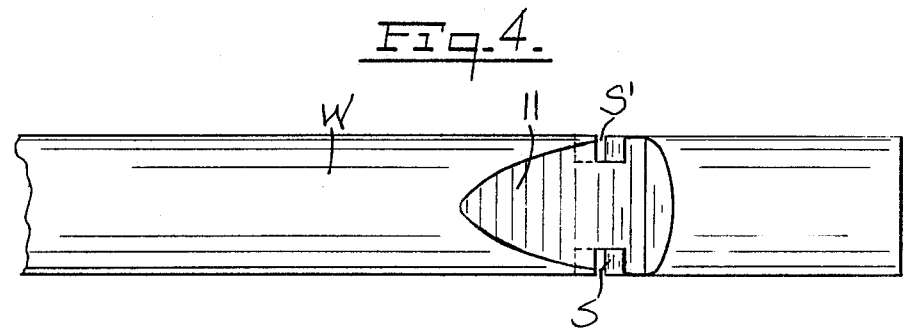
FIG. 4 represents a top plan view of the end of a workpiece (rafter) which has been notched and provided with wind stop slots.

The saw assemblies are shown, in FIGS. 3 and 4, in vertical position, for convenience in illustration.

Referring to the drawings, the machine is supported on a flat base 10, provided with a pair of parallel tracks 11,11 extending lengthwise of the base and trunnions 12,12 for the ends of a reverse threaded adjusting screw 13.

The saw assemblies 15, 16 are mirror duplicates so that only one will be described in detail. The assembly 15 includes a rectangular frame 14 having side rails 17, 18 constituting tracks, the rail 17 being pivotally mounted at 19 in the upper end of a post 20 which projects upward from the flat carriage 21. The carriage has four shoes 22 which rest on the tracks 11, 11 and a nut 23 is welded on the carriage and engaged with the screw 13. The orientation of the parts described above is such that the pivotal movement of the frame is in a plane parallel to the direction of feed of the workpiece and the tracks extend in a direction perpendicular to that plane.

Figure 1:
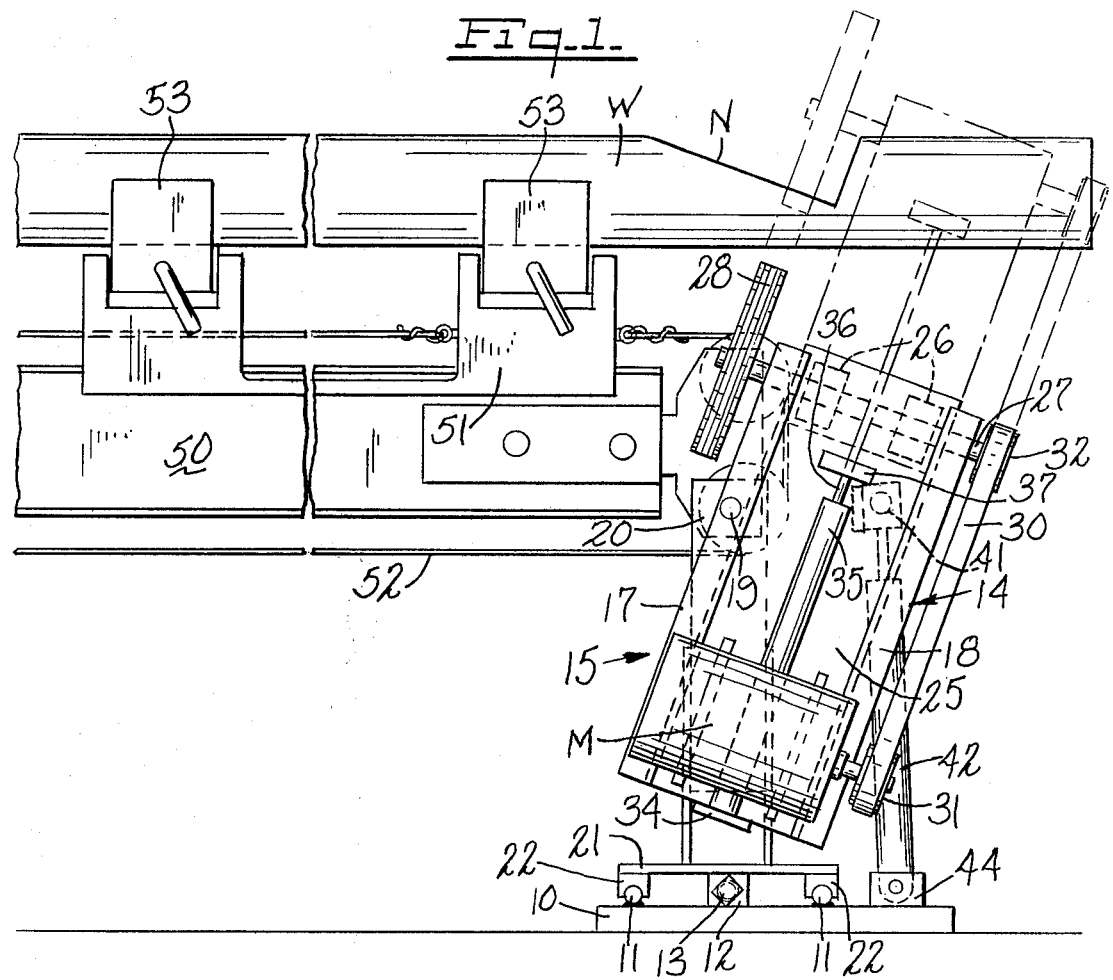
FIG. 1 represents a side elevation of the machine, with the saw assembly tilted to cutting position.

A rectangular plate 25 is fitted in the tracks 17, 18 for vertical sliding movement therein, the plate having bearings 26 adjacent its upper end for the axle 27 of the dado saw 28. A motor M is mounted on a bracket 29 adjacent the lower end of the plate and a drive belt 30 connects the motor pulley 31 to the pulley 32 on the axle 27. At the base of the frame is a seat 34 on which is mounted a fluid actuated cylinder 35 having a piston 36 connected to the lug 37 on the plate 25, so that actuation of the cylinder and piston can move the saw and motor assembly to the upper position shown in broken lines in FIG. 1.

The frame 14 and its counterpart 14' in assembly 16 are provided with bearing sleeves 40, 40' to receive a bar 41, with a sliding fit, and a fluid actuated cylinder 42 and piston 43 are connected between the bar 41 and a pair of lugs 44 on the base of the machine, the cylinder and piston being actuatable to vary and control the angular position of the saw assemblies 15, 16 around their respective pivot points 19.

The saw assemblies described above are adapted for use in connection with a feed table comprising a track 50 along which one or more dollies 51 can be moved by means of a cable 52, or otherwise, the dollies having clamps 53 for holding securely a workpiece W. The workpiece is assumed to be a roofing rafter which has been provided with a "bird's mouth" notch having a flat side N at an angle to the longitudinal axis of the rafter which corresponds to the intended pitch of the roof. The workpiece is centered as accurately as possible with respect to a vertical plane equidistant from the saw faces, the saw assemblies are adjusted (by cylinder and piston 42-43) to an angle from vertical corresponding to the angle from horizontal of the surface N, and the workpiece is advanced to the position shown in FIG. 1, where the path of the saw will intersect the surface N a short distance from its greatest depth. Assuming that wind stop slots are to be cut in both sides of the rafter, both saw motors are started and both cylinder and piston drives 35-36 are operated to move the saws upward along their cutting paths to form the slots S and S', the saws returning to retracted position along the same paths. If a slot is needed only on one side of a rafter, one of the saws can be silenced.

The spacing of the cutting faces of the saws, and thus the depth of the slots relative to the center line of the rafter can be adjusted by means of the screw 13 which is threaded half right hand and half left hand, for moving the carriages 21, 21' equal distances toward or away from a vertical plane through the rafter center line.

All elements of the machine are located in easily accessible positions so that maintenance, inspection, replacement and repair are greatly simplified.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

What we claim is:

1. A machine for side slotting a roofing rafter comprising means for supporting a rafter in a horizontal position, at least one rotary saw rotatable on an axis lying in a vertical plane parallel to the vertical plane through the center line of the rafter and spaced laterally therefrom, a motor operatively connected to the saw, a support for the saw and motor, the saw and motor support being pivotally mounted for movement around an axis perpendicular to said vertical planes and being independently laterally displaceable, means for adjusting the angular position of said saw and motor support, means for laterally displacing said saw and motor support, and means for moving the saw upward and downward along a rafter side cutting path.

2. A machine for side slotting a roofing rafter according to claim 1 which includes a base and a post projecting upward from the base, the saw and motor support including a frame with tracks and a plate slidable in said tracks, the frame being pivotally mounted on the post and the saw and motor being mounted on the plate.

3. A machine for side slotting a roofing rafter according to claim 2 which includes means for moving the post in directions toward or away from the vertical plane through the center line of the rafter.

4. A machine for side slotting a roofing rafter comprising means for supporting a rafter in a horizontal position, a pair of rotary saws each rotatable on an axis lying in a vertical plane parallel to and on opposite sides of the vertical plane through the center line of the rafter, a pair of motors each connected to a respective saw, supports for the saws and motors, each saw and motor support being pivotally mounted for movement around an axis perpendicular to said vertical planes, means for adjusting simultaneously the angular positions of both said saw and motor supports, and separate means for moving the saws into rafter cutting position.

5. A machine for side slotting a roofing rafter according to claim 4 which includes a base and two posts projecting upward from the base, each saw and motor support including a frame with tracks and a plate slidable in said tracks, each frame being pivotally mounted on a respective post and each saw and motor being mounted on a respective plate.

6. A machine for side slotting a roofing rafter according to claim 5 which includes means for moving the posts in directions toward or away from the vertical plane through the center line of the rafter.

* * * * *